Figure 1:
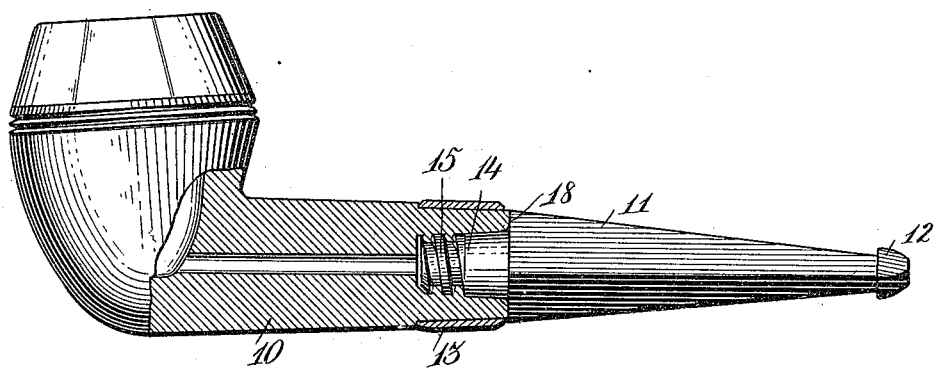

L. DEMUTH.
SMOKING PIPE.
APPLICATION FILED AUG. 15, 1913.

1,153,771.

Patented Sept. 14, 1915.

WITNESSES

INVENTOR
Leopold Demuth
BY
ATTORNEYS

UNITED STATES PATENT OFFICE.

LEOPOLD DEMUTH, OF NEW YORK, N. Y.

SMOKING-PIPE.

1,153,771.

Specification of Letters Patent. Patented Sept. 14, 1915.

Application filed August 15, 1913. Serial No. 784,878.

*To all whom it may concern:*

Be it known that I, LEOPOLD DEMUTH, a citizen of the United States, and a resident of the city of New York, borough of Manhattan, in the county and State of New York, have invented a new and Improved Smoking-Pipe, of which the following is a full, clear, and exact description.

My invention relates to smoking pipes which consist of a stummel and a detachable stem section. In smoking pipes of the indicated character, the detachable stem section is usually made of rubber or one of various compositions, and the great desideratum is to effect a proper air tight connection between the stummel and the detachable section. The connection is effected in practically all instances by means of a tenon which is either separately formed and secured to the stem section, to be detachable with the latter from the stummel, or formed integrally on the stem section. The tenon, whether integral or separately formed, either has a threaded connection with the stummel, or is tapered to fit friction tight in the stummel. A drawback in practice has been the frequent instances in which the material of the stem section and its tenon shrinks, which is particularly objectionable in the case of a tapered tenon designed to fit friction tight, the shrinkage serving to so loosen the connection that the stem section cannot be held securely, and an air tight connection is not possible. On the other hand, a threaded tenon is liable to breakage when strained by being screwed tightly in the effort to effect the air tight connection between the forward end of the stem section and the rear end of the stummel. It has been proposed also to employ a separate threaded tenon in connection with an integral boss or collar on the front of the stem section, but the liability of breakage is still present because of the necessity of employing a threaded tenon of comparatively small diameter.

My present invention overcomes the defects mentioned and comprises a stem section having an integral tenon, the base of which fits friction tight in the stummel, and a thread on the forward end of the tenon, there being a corresponding socket in the stummel formed with a smooth and a threaded section to receive the tenon. The unthreaded, smooth base prevents breakage by giving the necessary strength at the point heretofore liable to breakage, and the air tight connection is effected because of the tight fit of the base of the tenon in its socket, which is additional to the contact between the forward shoulder of the stem section and the rear end of the stummel. The short threaded portion at the front end of the tenon is not liable to breakage, the point of greatest strain and the usual point of breakage being the base of the tenon. Moreover, the front threaded portion may be made of substantially the same diameter as the unthreaded portion, which also contributes to the element of strength. In case of shrinkage with my improved stem section the thread still holds the stem in position, and the pipe may be made to possess in any event, the same degree of tightness in the connection as possessed by the ordinary threaded connection.

Reference is to be had to the accompanying drawings forming a part of this specification, in which similar characters of reference indicate corresponding parts in all the views.

Figures 2, 3:
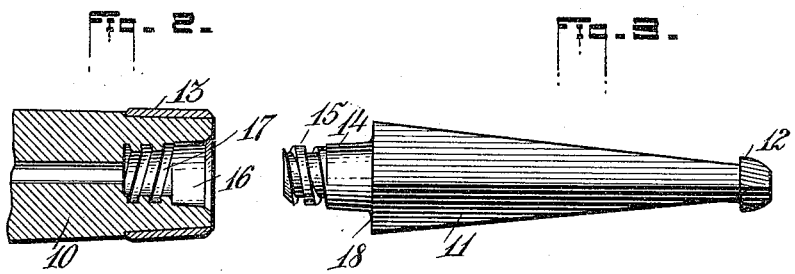

Figure 1 is a partly sectional elevation of a smoking pipe embodying my invention; Fig. 2 is a fragmentary longitudinal section of the rear end of the fixed stem section on the stummel; and Fig. 3 is a side elevation of the detachable stem section.

In forming a pipe in accordance with my invention, the stummel section 10 and the detachable stem 11 may be of any suitable shape or design, the stem section having any approved form of mouthpiece 12. Ordinarily, also, the stem section of the stummel will have a band or ferrule 13.

On the detachable stem 11, at the forward end, is formed an integral tenon 14, the base of which is tapered and the front end of which is formed with a coarse screw thread 15, there being a socket in the fixed stem section of the stummel, presenting correspondingly threaded and tapered portions, as indicated at 16, 17, in Fig. 2. The formation of the tenon results in a forward shoulder 18 at the forward end of the stem 11, at the base of the tenon. The unthreaded portion extends for a material distance forwardly from the junction with the shoulder 18, and it is of a diameter relatively to the corresponding portion 16 of the socket as to fit air tight therein, while the shoulder 18 is drawn close to the rear end of the stummel. Thus initially, the air tight closure is effected both at the unthreaded portion of the tenon and by the contacting opposed end surfaces of the stem section and stummel. If shrinkage occurs, the threaded connection not only holds the parts securely, but the tenon will resist the strain of any tightening up on the threaded connection, because of the rear portion being unthreaded and of increased strength. By confining the threaded portion to the front end, the weakening due to the threads extends for only a short distance, so that the threaded portion readily resists the strain of tightening up; thus the liability of the tenon being broken off is overcome, and I make provision for a tight connection under all conditions.

Having thus described my invention, I claim as new, and desire to secure by Letters Patent:

1. A smoking pipe of the character described comprising a bowl provided with a stem section, and a separate stem section, detachable from the first mentioned stem section, the detachable stem section having an integral tenon at the front end, said tenon being threaded at its front end for a short distance and plain and unthreaded for a material distance in the rear of the threaded portion, there being a front shoulder on the detachable stem section at the base of the unthreaded portion, the first mentioned stem section having a socket with an unthreaded rear portion and a threaded portion inward of the unthreaded portion to correspond with the tenon, the unthreaded portion of the tenon fitting its socket tightly and the opposed front shoulder of the separate stem binding against the opposed end of the stummel when the threaded connection is screwed up.

2. A smoking pipe comprising a bowl provided with a stem section, and a detachable stem section, the latter having an integral tenon, and a front shoulder at the base of the tenon, the said tenon being threaded at the front end only and for a short distance, the remainder of the tenon being tapered and unthreaded, and the first mentioned stem section having a socket with a plain unthreaded rear portion and a threaded portion inward of the plain portion, to correspond with the tenon, the unthreaded portion of the tenon being received wholly in the stummel and the shoulder of the detachable stem section fitting tightly against the rear end of the stem section of the stummel when the mating threads are screwed up.

3. A smoking pipe of the character described, comprising a bowl provided with a fixed stem section, and a second detachable stem section having an integral tenon at the front end, the said tenon being threaded at its front end and plain and unthreaded at the base of the tenon in the rear of the threaded portion, the first mentioned stem section having a socket with an unthreaded rear portion tightly receiving the plain unthreaded portion of the detachable stem section, and the fixed stem section having directly formed thereon an internal thread corresponding with the thread on the tenon.

In testimony whereof I have signed my name to this specification in the presence of two subscribing witnesses.

LEOPOLD DEMUTH.

Witnesses:
J. L. McAuliffe,
Philip D. Rollhaus.